S. Groom,
Making Wooden Screws.
Nº 4,671.      Patented July 28, 1846.
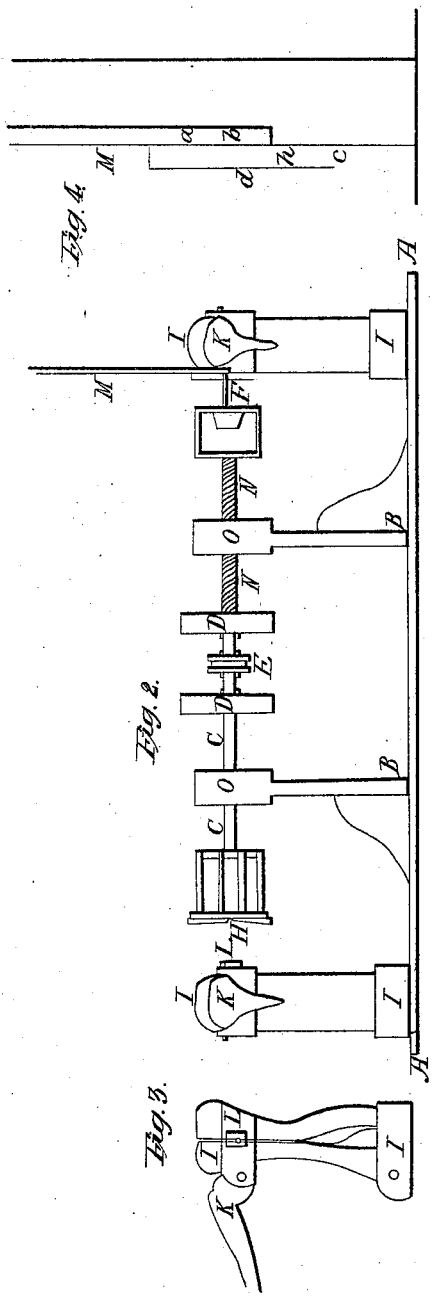
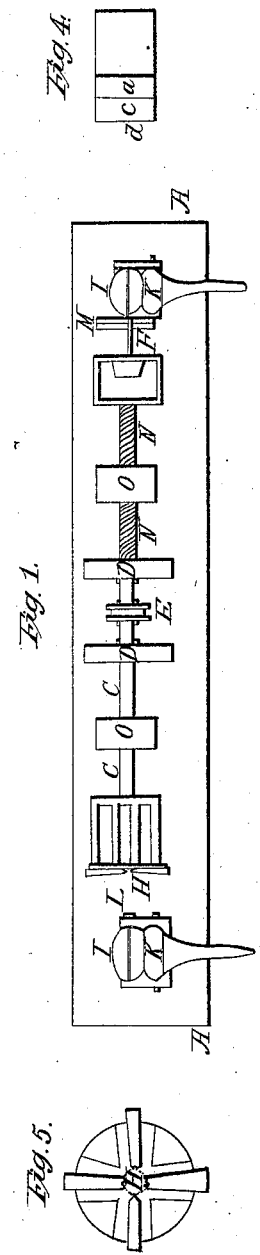

UNITED STATES PATENT OFFICE.

SMITH GROOM, OF TROY, NEW YORK.

MACHINERY FOR CUTTING THREADS ON SCREWS AND NUTS.

Specification of Letters Patent No. 4,671, dated July 28, 1846.

*To all whom it may concern:*

Be it known that I, SMITH GROOM, of the city of Troy, in the county of Rensselaer and State of New York, have invented a new and useful Machine for Cutting Screws, Bolts, and Nuts, of which the following is an accurate and full description, reference being had to the annexed drawings, making a part of this specification.

In the drawings Figure 1, is the plan or horizontal projection and Fig. 2, the elevation or vertical projection of the machine. Figs. 3, 4 and 5 are sections of the same.

A, A, the base, is constructed of such material as is most convenient and suitable.

B, B, the center standards, have journal boxes O, O, in which is fitted the shaft C, C. This shaft may be moved by any power now used in mechanical operations. In the drawing it is represented to be moved by the two wheels D, D, operated upon by bands and which impart a rotary motion in opposite directions, regulated by the clutch E.

At the ends of the shaft are attached either taps, as at F, or dies, or cutters composed of one or more diamond, round or square points, arranged in the face plate or chuck H, and which may be graduated to cut large or small screws and coarse or fine threads, at pleasure.

The two outer standards I, I, have, either or both of them, a vise or jaw, operated upon by means of a lever as at K, or by screw, or cam, or wedge, or by such other means as may be found advantageous and are intended to embrace dies L, which secure the rod while the screw is being cut upon it.

The arrangement for cutting nuts is represented at M, of which Fig. 4 is an enlarged section.

*a*, is a tube, or hopper filled with nuts to be cut. The lower one is at *b*, and the tap, entering at *d*, after cutting the thread, on the reversal of the motion of the shaft, withdraws the nut against the plate *h*, and on the disengagement of the tap, the nut necessarily falls through the cavity *c*, beneath. Upon the withdrawal of the nut operated upon, its place is occupied by the one immediately above it, thus making it a self feeding operation.

To affect the forcing up of the cutting tool to the bolt or nut to be operated upon, there is a single or double screw cut on the shaft, N, N, or a thimble is attached to it (which may be removed at pleasure) which screw traverses a corresponding screw thread cut in the journal boxes O, O, and which imparts a regular and equitable motion to the shaft.

What I claim and desire to secure by Letters Patent is—

The arrangement of nuts and bolts, or either of them, in such manner that, while the cutting tool attached to one end of the shaft retraverses the thread of the nut or screw last cut, it necessarily forces the cutting tool, at the opposite end, up to and makes it operate upon the bolt or nut next to be cut.

SMITH GROOM.

Witnesses:
  S. W. WAITE,
  ARCHIBALD BULL.